US007767034B2

(12) United States Patent
Maeda et al.

(10) Patent No.: US 7,767,034 B2
(45) Date of Patent: Aug. 3, 2010

(54) SOFT MAGNETIC MATERIAL, POWDER MAGNETIC CORE AND METHOD OF MANUFACTURING SOFT MAGNETIC MATERIAL

(75) Inventors: Toru Maeda, Itami (JP); Naoto Igarashi, Itami (JP); Haruhisa Toyoda, Itami (JP); Hirokazu Kugai, Osaka (JP); Kazuyuki Hayashi, Otake (JP); Hiroko Morii, Otake (JP); Seiji Ishitani, Otake (JP)

(73) Assignees: Sumitomo Electric Industries, Ltd., Osaka (JP); Toda Kogyo Corp., Hiroshima (JP)

( * ) Notice: Subject to any disclaimer, the term of this patent is extended or adjusted under 35 U.S.C. 154(b) by 639 days.

(21) Appl. No.: 11/629,976

(22) PCT Filed: Sep. 29, 2005

(86) PCT No.: PCT/JP2005/018035

§ 371 (c)(1), (2), (4) Date: Dec. 19, 2006

(87) PCT Pub. No.: WO2006/035911

PCT Pub. Date: Apr. 6, 2006

(65) Prior Publication Data

US 2007/0235109 A1 Oct. 11, 2007

(30) Foreign Application Priority Data

Sep. 30, 2004 (JP) ............................ 2004-286164

(51) Int. Cl.
*H01F 1/20* (2006.01)
*H01F 1/24* (2006.01)
*B32B 5/00* (2006.01)

(52) U.S. Cl. .................... 148/306; 252/62.55; 428/403; 427/127

(58) Field of Classification Search ....................... None
See application file for complete search history.

(56) References Cited

U.S. PATENT DOCUMENTS 6,756,118 B2 * 6/2004 Aichele et al. ............. 428/403

(Continued)

FOREIGN PATENT DOCUMENTS

JP 63-115309 5/1988

(Continued)

OTHER PUBLICATIONS

European Search Report, issued in corresponding European Patent Application No. 05788221.9-1215 dated on Dec. 4, 2007.

(Continued)

*Primary Examiner*—John P Sheehan
(74) *Attorney, Agent, or Firm*—McDermott Will & Emery LLP

(57) ABSTRACT

A soft magnetic material is a soft magnetic material including a composite magnetic particle (30) having a metal magnetic particle (10) mainly composed of Fe and an insulating coating (20) covering metal magnetic particle (10), and insulating coating (20) contains an iron phosphate compound and an aluminum phosphate compound. The atomic ratio of Fe contained in a contact surface of insulating coating (20) in contact with metal magnetic particle (10) is larger than the atomic ratio of Fe contained in the surface of insulating coating (20). The atomic ratio of Al contained in the contact surface of insulating coating (20) in contact with metal magnetic particle (10) is smaller than the atomic ratio of Al contained in the surface of insulating coating (20). Thus, iron loss can be reduced.

4 Claims, 14 Drawing Sheets

U.S. PATENT DOCUMENTS

| | | | |
|---|---|---|---|
| 2003/0077448 | A1 | 4/2003 | Ueta et al. |
| 2004/0061582 | A1 | 4/2004 | Kondo et al. |
| 2004/0126609 | A1 | 7/2004 | Ueta et al. |

FOREIGN PATENT DOCUMENTS

| | | | |
|---|---|---|---|
| JP | 64-083671 | | 3/1989 |
| JP | 3-153863 | | 7/1991 |
| JP | 11-238614 | | 8/1999 |
| JP | 2001-085211 | | 3/2001 |
| JP | 2003-209010 | | 7/2003 |
| JP | 2003-272911 | * | 9/2003 |
| JP | 2003-303711 | | 10/2003 |
| JP | 2003-318013 | | 11/2003 |

OTHER PUBLICATIONS

Japanese Notice of Grounds of Rejection, with English translation, issued in Japanese Patent Application No. 2005-284991, mailed Apr. 6, 2010.

* cited by examiner

SOFT MAGNETIC MATERIAL, POWDER MAGNETIC CORE AND METHOD OF MANUFACTURING SOFT MAGNETIC MATERIAL

TECHNICAL FIELD

The present invention relates to a soft magnetic material, a powder magnetic core and a method of manufacturing a soft magnetic material, and more specifically, it relates to a soft magnetic material capable of reducing iron loss, a powder magnetic core and a method of manufacturing a soft magnetic material.

BACKGROUND ART

In general, an electromagnetic steel sheet is used for an electric apparatus having an electromagnetic valve, a motor or a power supply circuit as a soft magnetic component. The soft magnetic component is required to have magnetic characteristics capable of acquiring a large magnetic flux density and capable of sensitively reacting against external field change.

When this soft magnetic component is used in an alternating magnetic field, energy loss referred to as iron loss takes place. This iron loss is expressed in the sum of hysteresis loss and eddy current loss. The hysteresis loss corresponds to energy necessary for changing the magnetic flux density of the soft magnetic component. The hysteresis loss, proportionate to the working frequency, is mainly dominant in a low-frequency domain of not more than 1 kHz. The term “eddy current loss” herein used denotes energy loss mainly resulting from eddy current flowing in the soft magnetic component. The eddy current loss, proportionate to the square of the working frequency, is mainly dominant in a high-frequency domain of at least 1 kHz.

The soft magnetic component is required to have a magnetic characteristic reducing this iron loss. In order to implement this, the permeability $\mu$, the saturation magnetic flux density Bs and the electric resistivity $\rho$ of the soft magnetic component must be increased, and the coercive force $H_c$ of the soft magnetic component must be reduced.

In recent years, a powder magnetic core having smaller eddy current loss as compared with an electromagnetic steel sheet has attracted attention due to the progress of a high working frequency toward a high output and high efficiency of an apparatus. This powder magnetic core consists of a plurality of composite magnetic particles having metal magnetic particles and glassy insulating coatings covering the surfaces thereof. The metal magnetic particles are made of Fe, an Fe—Si-based alloy, an Fe—Al (aluminum)-based alloy, an Fe—N (nitrogen)-based alloy, an Fe—Ni (nickel)-based alloy, an Fe—C (carbon)-based alloy, an Fe—B (boron)-based alloy, an Fe—Co (cobalt)-based alloy, an Fe—P-based alloy, an Fe—P-based alloy, an Fe—Ni—Co-based alloy, an Fe—Cr (chromium)-based alloy or an Fe—Al—Si-based alloy.

In order to reduce the hysteresis loss in the iron loss of the powder magnetic core, the coercive force Hc of the powder magnetic core may be reduced by eliminating strains and dislocations from the metal magnetic particles and simplifying movement of magnetic walls. In order to sufficiently eliminate strains and dislocations from the metal magnetic particles, the molded powder magnetic core must be heat-treated at a high temperature of at least 400° C., preferably at a high temperature of at least 550° C., more preferably at a high temperature of at least 650° C.

However, the insulating coatings are made of an amorphous compound such as an iron phosphate compound, for example, due to requirement for resistance against powder deformation in molding, and attain no sufficient high-temperature stability. When an attempt is made to heat-treat the powder magnetic core at a high temperature of at least 400° C., the insulation properties are lost due to diffusion/penetration of the metallic elements constituting the metal magnetic particles into the amorphous substance. Thus, there has been such a problem that the electric resistivity $\rho$ of the powder magnetic core is reduced to increase the eddy current loss when an attempt is made to reduce the hysteresis loss by high-temperature heat treatment. In particular, a small size, high efficiency and a large output have recently been required to the electric apparatus, and it is necessary to use the electric apparatus in a higher frequency domain in order to satisfy these requirements. Increased eddy current loss in the high-frequency domain hinders the attempt for attaining a small size, high efficiency and a large output of the electric apparatus.

In relation to this, Japanese Patent Laying-Open No. 2003-272911 (Patent Literature 1) or Japanese Patent Laying-Open No. 2003-303711 (Patent Literature 2), for example, discloses a technique capable of improving high-temperature stability of insulating coatings. The aforementioned Patent Literature 1 discloses a soft magnetic material of composite magnetic particles having insulating coatings of aluminum phosphate exhibiting high high-temperature stability. In the aforementioned Patent Literature 1, the soft magnetic material is manufactured in the following method: First, an insulating coating solution containing phosphate containing aluminum and dichromic salt containing potassium or the like, for example, is sprayed on iron powder. Then, the iron powder sprayed with the insulating coating solution is held at 300° C. for 30 minutes, and held at 100° C. for 60 minutes. Thus, insulating coatings formed on the iron powder are dried. Then, the iron powder formed with the insulating coatings is pressure-molded and heat-treated after the pressure molding, to complete the soft magnetic material.

The aforementioned Patent Literature 2 discloses iron-based powder, which is iron-based powder comprising powder, mainly composed of iron, whose surfaces are covered with coatings containing silicone resin and a pigment, and having coatings containing a phosphorus compound as underlayers of the coatings containing silicone resin and the pigment.

Patent Literature 1: Japanese Patent Laying-Open No. 2003-272911

Patent Literature 2: Japanese Patent Laying-Open No. 2003-303711

DISCLOSURE OF THE INVENTION

Problems to be Solved by the Invention

However, the technique disclosed in the aforementioned Patent Literature 1 has such a defect that adhesiveness between aluminum phosphate and the metal magnetic particles is insufficient and the flexibility of the aluminum phosphate-based insulating coatings is low. When the iron powder formed with the aluminum phosphate-based insulating coatings has been pressure-molded, therefore, the insulating coatings have been broken due to pressure, to reduce the electric resistivity $\rho$ of the soft magnetic material. Consequently, the eddy current loss has been problematically increased. Also in the technique disclosed in the aforementioned Patent Literature 2, it has been impossible to improve both of heat resistance and flexibility, and it has been impossible to sufficiently reduce the iron loss.

Accordingly, an object of the present invention is to provide a soft magnetic material capable of reducing iron loss, a powder magnetic core and a method of manufacturing a soft magnetic material.

Means for Solving the Problems

A soft magnetic material according to the present invention is a soft magnetic material including a composite magnetic particle having a metal magnetic particle mainly composed of Fe (iron) and an insulating coating covering the metal magnetic particle, and the insulating coating contains phosphoric acid, Fe and at least one type of atom selected from a group consisting of Al, Si (silicon), Mn (manganese), Ti (titanium), Zr (zirconium) and Zn (zinc). The atomic ratio of Fe contained in a contact surface of the insulating coating in contact with the metal magnetic particle is larger than the atomic ratio of Fe contained in the surface of the insulating coating. The atomic ratio of the aforementioned at least one type of atom contained in the contact surface of the insulating coating in contact with the metal magnetic particle is smaller than the atomic ratio of the aforementioned at least one type of atom contained in the surface of the insulating coating.

According to the inventive soft magnetic material, the contact surface of the insulating coating in contact with the metal magnetic particle is formed by a layer containing large quantities of phosphoric acid and Fe. The layer containing the large quantities of phosphoric acid and Fe has high adhesiveness with respect to Fe, whereby adhesiveness between the metal magnetic particle and the insulating coating can be improved. Therefore, the insulating coating is hardly broken in pressure molding, and increase of eddy current loss can be suppressed. Further, the surface of the insulating coating is formed by a layer containing large quantities of phosphoric acid and at least one type of atom selected from the group consisting of Al, Si, Mn, Ti, Zr and Zn. The layer containing the large quantities of phosphoric acid and at least one type of atom selected from the group consisting of Al, Si, Mn, Ti, Zr and Zn has superior high-temperature stability as compared with the layer containing the large quantities of phosphoric acid and Fe, whereby the soft magnetic material is not broken when heat-treated at a high temperature. In addition, this layer also prevents decomposition of the layer formed on the contact surface of the insulating coating in contact with the metal magnetic particle. Therefore, heat resistance of the insulating coating can be improved, and hysteresis loss of a powder magnetic core prepared by pressure-molding this soft magnetic material can be reduced without deteriorating the eddy current loss. Thus, iron loss of the powder magnetic core can be reduced.

Preferably in the soft magnetic material according to the present invention, the insulating coating has a first insulating coating covering the metal magnetic particle and a second insulating coating covering the first insulating coating. The first insulating coating contains phosphoric acid and Fe, and the second insulating coating contains phosphoric acid and the said at least one type of atom.

Thus, the insulating coating has a two-layer structure of the first insulating coating having excellent adhesiveness with respect to the metal magnetic particle and the second insulating coating, having superior high-temperature stability to the first insulating coating, covering the first insulating coating. Adhesiveness between the metal magnetic particle and the insulating coating can be improved through the first insulating coating, and heat resistance of the insulating coating can be improved through the second insulating coating.

Preferably in the soft magnetic material according to the present invention, the composite magnetic particle further has an Si-containing coating, exhibiting insulation properties, covering the surface of the insulating coating. Thus, the Si-containing coating ensures insulation between metal magnetic particles, whereby increase of the eddy current loss in the powder magnetic core prepared by pressure-molding this soft magnetic material can be further suppressed.

A powder magnetic core according to the present invention is prepared by pressure-molding the aforementioned soft magnetic material.

A method of manufacturing a soft magnetic material according to the aspect of the present invention is a method of manufacturing a soft magnetic material including a composite magnetic particle having a metal magnetic particle mainly composed of Fe and an insulating coating covering the metal magnetic particle, comprising the step of forming the insulating coating covering the metal magnetic particle. The step of forming the insulating coating includes a first coating step of forming a first insulating coating by coating the metal magnetic particle with a compound or a solution containing an Fe ion and a phosphoric acid ion and a second coating step of forming a second insulating coating by coating the first insulating coating with a compound or a solution containing at least one type of ion selected from a group consisting of an Al ion, a Si ion, a Mn ion, a Ti ion, a Zr ion and a Zn ion and a phosphoric acid ion after the first coating step.

A method of manufacturing a soft magnetic material according to another aspect of the present invention is a method of manufacturing a soft magnetic material including a composite magnetic particle having a metal magnetic particle mainly composed of Fe and an insulating coating covering the metal magnetic particle, comprising the step of forming the said insulating coating covering the metal magnetic particle. The step of forming the insulating coating includes a first coating step of forming a first insulating coating by adding a phosphoric acid solution into a suspension prepared by dispersing soft magnetic particle powder in an organic solvent and performing mixing/stirring and a second coating step of forming a second insulating coating by adding a solution of phosphoric acid and a solution of a metal alkoxide containing at least one type of atom selected from a group consisting of Al, Si, Ti and Zn into the suspension and performing mixing/stirring after the first coating step.

According to the inventive method of manufacturing a soft magnetic material, the contact surface of the insulating coating in contact with the metal magnetic particle is formed by the first insulating coating containing phosphoric acid and Fe. A layer containing large quantities of phosphoric acid and Fe has high adhesiveness with respect to Fe, whereby adhesiveness between the metal magnetic particle and the insulating coating can be improved. Therefore, the insulating coating is hardly broken in pressure molding, and increase of eddy current loss of a powder magnetic core prepared by pressure-molding this soft magnetic material can be suppressed. Further, the surface of the insulating coating is formed by the second insulating coating containing phosphoric acid and at least one type of atom selected from the group consisting of Al, Si, Ti and Zr. A layer containing large quantities of phosphoric acid and at least one type of atom selected from the group consisting of Al, Si, Ti and Zr has superior high-temperature stability as compared with the first insulating coating containing phosphoric acid and Fe, whereby insulation properties are not deteriorated when the soft magnetic material is heat-treated at a high temperature. In addition, the second insulating coating also prevents decomposition of the first insulating coating. Therefore, heat resistance of the insulating coating can be improved, and hysteresis loss of the powder magnetic core prepared by pressure-molding this soft magnetic material can be reduced. Thus, iron loss of the powder magnetic core can be reduced.

In this specification, the wording "mainly composed of Fe" denotes that the ratio of Fe is at least 50 mass %.

EFFECTS OF THE INVENTION

According to each of the inventive soft magnetic material, the inventive powder magnetic core and the inventive method of manufacturing a soft magnetic material, the insulating coating is hardly broken in pressure molding, and increase of the eddy current loss of the powder magnetic core can be suppressed. Further, the heat resistance of the insulating coating can be improved, and the hysteresis loss can be reduced. Therefore, the iron loss of the powder magnetic core can be reduced.

Figure 1:
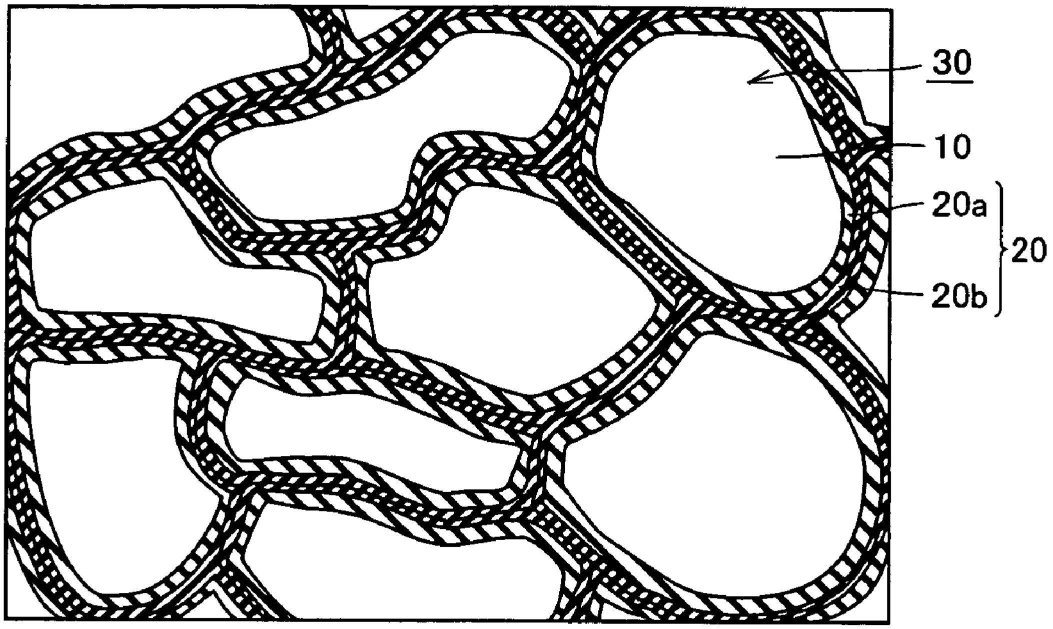
FIG. 1 is a schematic diagram showing a powder magnetic core prepared from a soft magnetic material according to a first embodiment of the present invention in an enlarged manner.

DESCRIPTION OF REFERENCE NUMERALS 10 metal magnetic particle, 20, 20*a* to 20*c* insulating coating, 20*d* boundary region, 25 coating, 30 composite magnetic particle.

BEST MODES FOR CARRYING OUT THE INVENTION

Embodiments of the present invention are now described with reference to the drawings.

First Embodiment

FIG. 1 is a schematic diagram showing a powder magnetic core prepared from a soft magnetic material according to a first embodiment of the present invention in an enlarged manner. As shown in FIG. 1, the powder magnetic core prepared from the soft magnetic material according to this embodiment includes a plurality of composite magnetic particles 30 having metal magnetic particles 10 and insulating coatings 20 covering the surfaces of metal magnetic particles 10. Plurality of composite magnetic particles 30 are bonded to each other by organic substances (not shown) or through meshing between irregularities of composite magnetic particles 30, for example.

Metal magnetic particles 10 are made of Fe, an Fe—Si-based alloy, an Fe—Al-based alloy, an Fe—N (nitrogen)-based alloy, an Fe—Ni (nickel)-based alloy, an Fe—C (carbon)-based alloy, an Fe—B (boron)-based alloy, an Fe—Co (cobalt)-based alloy, an Fe—P-based alloy, an Fe—P-based alloy, an Fe—Ni-Co-based alloy, an Fe—Cr (chromium)-based alloy or an Fe—Al—Si-based alloy, for example. Metal magnetic particles 10 may simply be mainly composed of Fe, and may be in the form of a simple substance or an alloy.

The average particle diameter of metal magnetic particles 10 is preferably at least 5 μm and not more than 300 μm. When the average particle diameter of metal magnetic particles 10 is at least 5 μm, the metals are so hardly oxidized that the magnetic characteristics of the soft magnetic material can be inhibited from reduction. When the average particle diameter of metal magnetic particles 10 is not more than 300 μm, compressibility of mixed powder can be inhibited from reduction in a subsequent molding step. Thus, the density of a compact obtained through the molding step is not reduced, and difficulty in handling can be prevented.

The average particle diameter denotes the particle diameter of such particles that the sum of masses from that having the minimum particle diameter reaches 50% of the total mass in a histogram of particle diameters measured by screening, i.e., the 50% particle diameter D.

Insulating coatings 20 have insulating coatings 20*a* of an iron phosphate compound, for example, and insulating coatings 20*b* of an aluminum phosphate compound, for example. Insulating coatings 20*a* cover metal magnetic particles 10, and insulating coatings 20*b* cover insulating coatings 20*a*. In other words, metal magnetic particles 10 are covered with insulating coatings 20 of a two-layer structure. Insulating coatings 20 function as insulating layers between metal magnetic particles 10. Electric resistivity ρ of a powder magnetic core obtained by pressure-molding this soft magnetic material can be increased by covering metal magnetic particles 10 with insulating coatings 20. Thus, eddy current loss of the powder magnetic core can be reduced by inhibiting eddy current from flowing between metal magnetic particles 10. While insulating coatings 20*b* consist of the aluminum phosphate compound in this embodiment, insulating coatings 20*b* may alternatively consist of a manganese phosphate compound or a zinc phosphate compound according to the present invention.

The thickness of insulating coatings 20 is preferably at least 0.005 μm and not more than 20 μm. Energy loss resulting from the eddy current can be effectively suppressed by setting the thickness of insulating coatings 20 to at least 0.005 μm. Further, the thickness of insulating coatings 20 is so set to not more than 20 μm that the ratio of insulating coatings 20 occupying the soft magnetic material is not excessively increased. Thus, the magnetic flux density of the powder magnetic core obtained by pressure-molding this soft magnetic material can be prevented from remarkable reduction.

Figure 2A:
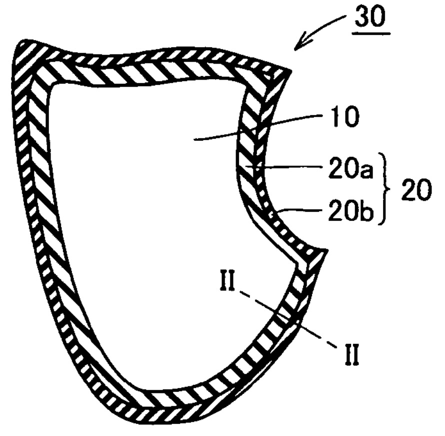
FIG. 2A is an enlarged view showing a composite magnetic particle in FIG. 1.
Figure 2B:
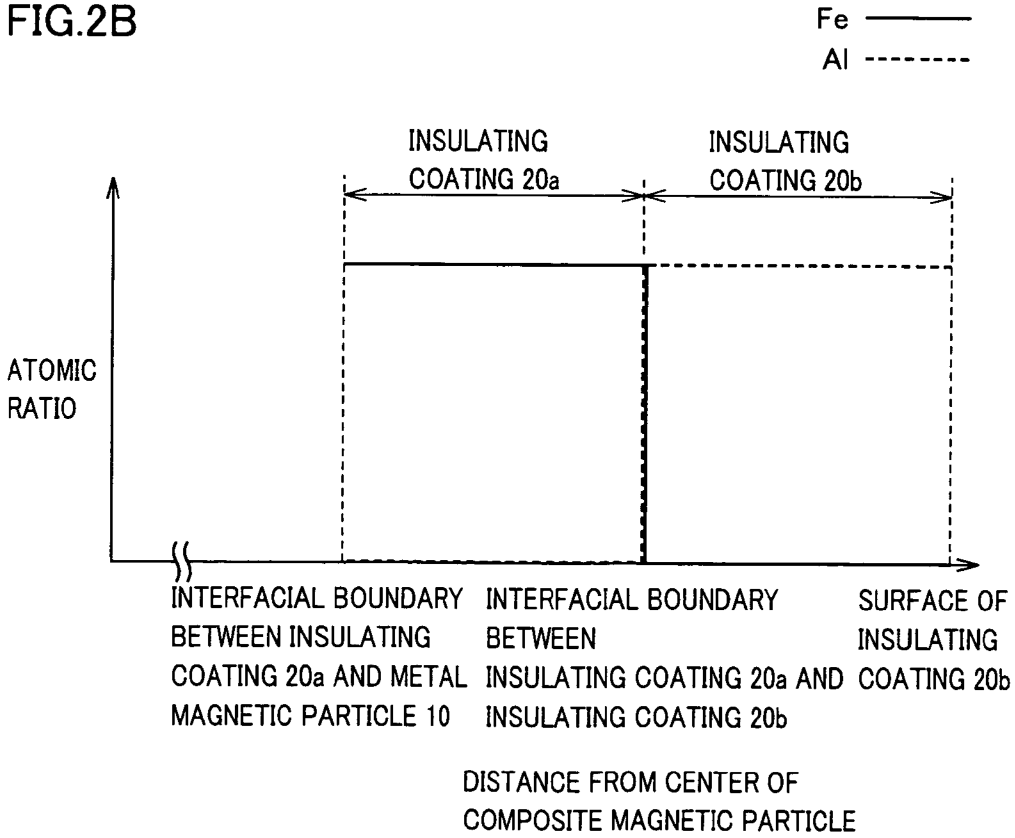
FIG. 2B is a diagram showing changes of an atomic ratio of Fe and an atomic ratio of Al along the line II-II in an insulating coating shown in FIG. 2A.

FIG. 2A is an enlarged view showing a composite magnetic particle in FIG. 1. FIG. 2B is a diagram showing changes of an atomic ratio of Fe and an atomic ratio of Al along the line II-II in the insulating coatings shown in FIG. 2A.

Referring to FIGS. 2A and 2B, insulating coating 20*a* contains a constant quantity of Fe, and contains no Al. The atomic ratio of Fe and the atomic ratio of Al discontinuously change on the interfacial boundary between insulating coating 20*a* and insulating coating 20*b*, and insulating coating 20*b* contains not Fe but a constant quantity of Al. In other words, the atomic ratio of Fe contained in a contact surface of insulating coating 20 in contact with metal magnetic particle 10 is larger than the atomic ratio of Fe contained in the surface of insulating coating 20. Further, the atomic ratio of Al contained in the contact surface of insulating coating 20 in contact with metal magnetic particle 10 is smaller than the atomic ratio of Al contained in the surface of insulating coating 20.

A method of manufacturing the powder magnetic core shown in FIG. 1 is now described.

Figure 3:
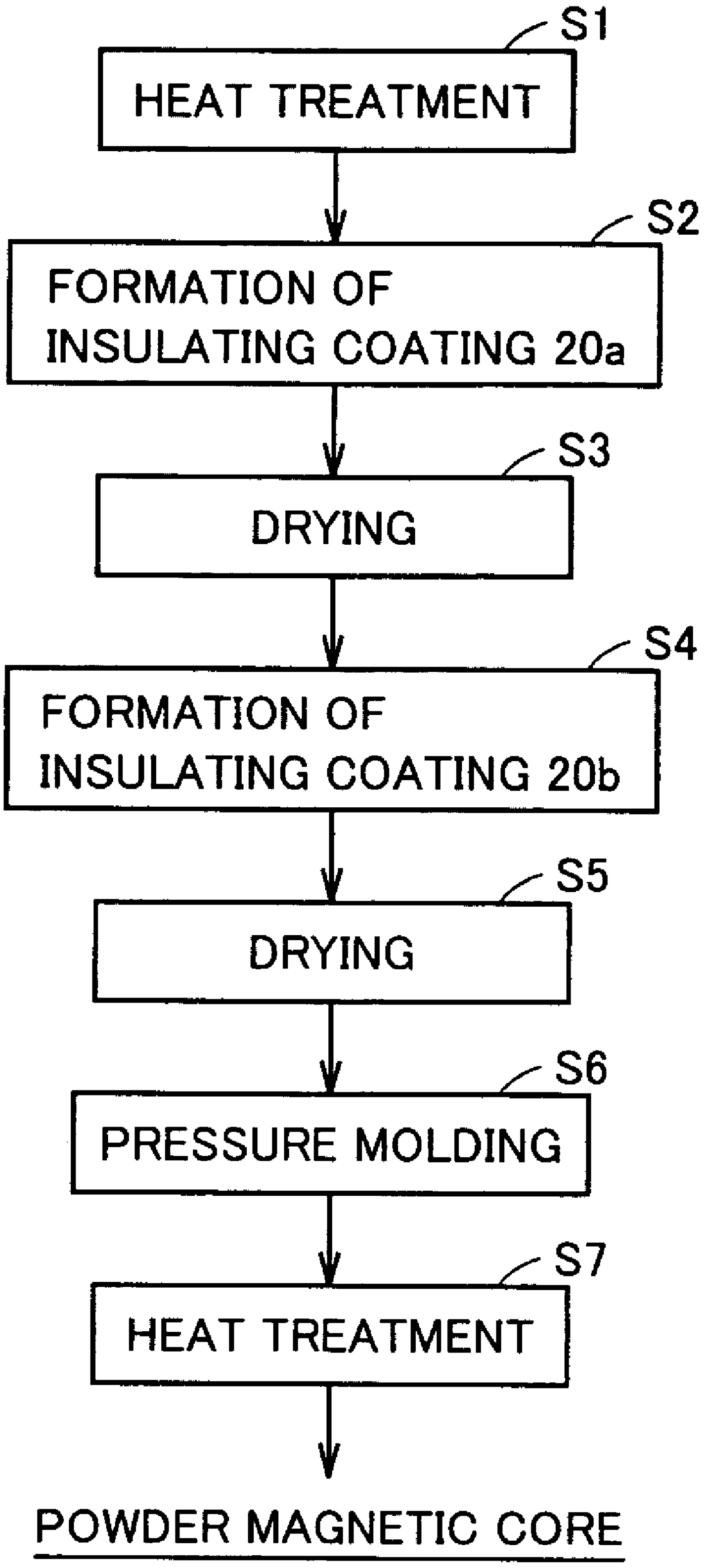
FIG. 3 is a diagram showing a method of manufacturing a powder magnetic core according to the first embodiment of the present invention along the step order.

FIG. 3 is a diagram showing the method of manufacturing the powder magnetic core according to the first embodiment along the step order. Referring to FIG. 3, metal magnetic particles 10, mainly composed of Fe, consisting of pure iron, Fe, an Fe—Si-based alloy or an Fe—Co-based alloy, for example, are prepared, and metal magnetic particles 10 are heat-treated at a temperature of at least 400° C. and less than 900° C. (step S1). The temperature of the heat treatment is more preferably at least 700° C. and less than 900° C. A large number of strains (dislocations and defects) are present in metal magnetic particles 10 not yet heat-treated. The number of these strains can be reduced by performing the heat treatment on metal magnetic particles 10. This heat treatment may be omitted.

Then, insulating coatings 20*a* are formed by wet processing, for example (step S2). This step is detailedly described. First, metal magnetic particles 10 are dipped in an aqueous solution, so that the aqueous solution is applied to metal magnetic particles 10. An aqueous solution (first solution) containing Fe ions and $PO_4$ (phosphoric acid) ions is employed as the aqueous solution employed in this embodiment. The pH of the aqueous solution is adjusted with NaOH, for example. The time for dipping metal magnetic particles 10 is 10 minutes, for example, and the aqueous solution is continuously stirred during the dipping so that no metal magnetic particles 10 precipitate on the bottom. Metal magnetic particles 10 are covered with insulating coatings 20*a* of the iron phosphate compound due to the application of the aqueous solution to metal magnetic particles 10. Thereafter metal magnetic particles 10 covered with insulating coatings 20*a* are washed with water and acetone.

Then, metal magnetic particles 10 covered with insulating coatings 20*a* are dried (step S3). The drying is performed at a temperature of not more than 150° C., preferably performed at a temperature of not more than 100° C. Further, the drying is performed for 120 minutes, for example.

Then, insulating coatings 20*b* of an aluminum phosphate compound are formed by wet processing, for example (step S4). More specifically, metal magnetic particles 10 formed with insulating coatings 20*a* are dipped in an aqueous solution, so that the aqueous solution (second solution) is applied to insulating coatings 20*a*. An aqueous solution containing Al ions and $PO_4$ ions is employed as the aqueous solution employed in this embodiment. The remaining detailed conditions are substantially identical to the conditions in the case of forming insulating coatings 20*a*, and hence redundant description is not repeated.

While the case of forming insulating coatings 20*b* of the aluminum phosphate compound has been shown in this embodiment, insulating coatings 20*b* of a manganese phosphate compound may alternatively be formed through an aqueous solution containing Mn ions and $PO_4$ ions in place of the aqueous solution containing Al ions and $PO_4$ ions. Further alternatively, insulating coatings 20*b* of a zinc phosphate compound may be formed through an aqueous solution containing Zn ions and $PO_4$ ions.

Then, metal magnetic particles 10 covered with insulating coatings 20*b* are dried (step S5). The drying is performed at a temperature of not more than 150° C., preferably performed at a temperature of not more than 100° C. Further, the drying is performed for 120 minutes, for example.

The soft magnetic material according to this embodiment is completed through the aforementioned steps. In a case of preparing a powder magnetic core, the following steps are further carried out:

Then, powder of the obtained soft magnetic material is introduced into a mold, and pressure-molded with a pressure of 390 (MPa) to 1500 (MPa), for example (step S6). Thus, a green compact is obtained through compression of the powder of metal magnetic particles 10. The pressure-molding atmosphere is preferably set to an inert gas atmosphere or a decompressed atmosphere. In this case, mixed powder can be prevented from oxidation with oxygen contained in the atmosphere.

Then, the green compact obtained by the pressure molding is heat-treated at a temperature of at least 400° C. and not more than 900° C. (step S7). A large number of strains and dislocations formed in the green compact obtained through the pressure molding step can be eliminated due to the heat treatment. The powder magnetic core shown in FIG. 1 is completed through the aforementioned steps.

The soft magnetic material according to this embodiment is the soft magnetic material including composite magnetic particles 30 having metal magnetic particles 10 mainly composed of Fe and insulating coatings 20 covering metal magnetic particles 10, and insulating coatings 20 contain the iron phosphate compound and the aluminum phosphate compound. The atomic ratio of Fe contained in the contact surfaces of insulating coatings 20 in contact with metal magnetic particles 10 is larger than the atomic ratio of Fe contained in the surfaces of insulating coatings 20. The atomic ratio of Al contained in the contact surfaces of insulating coatings 20 in contact with metal magnetic particles 10 is smaller than the atomic ratio of Al contained in the surfaces of insulating coatings 20.

According to the soft magnetic material according to this embodiment, the contact surfaces of insulating coatings 20 in contact with metal magnetic particles 10 are made of the iron phosphate compound. Adhesiveness between Fe and the iron phosphate compound is superior to adhesiveness between Fe and an aluminum phosphate compound, adhesiveness between Fe and a silicon phosphate compound, adhesiveness between Fe and a manganese phosphate compound and adhesiveness between Fe and a zinc phosphate compound, whereby adhesiveness between metal magnetic particles 10 and insulating coatings 20 can be improved. Therefore, insulating coatings 20 are hardly broken in the pressure molding, and increase of eddy current loss in the powder magnetic core obtained by pressure-molding this soft magnetic material can be suppressed. Further, the surfaces of insulating coatings 20 are made of the aluminum phosphate compound. The aluminum phosphate compound has superior high-temperature stability as compared with the iron phosphate compound, whereby the insulation properties of insulating coatings 20*b* are not deteriorated when the soft magnetic material is heat-treated at a high temperature. Further, insulating coatings 20*b* also prevent decomposition of insulating coatings 20*a*. Therefore, heat resistance of insulating coatings 20 can be improved, and hysteresis loss of the powder magnetic core obtained by pressure-molding this soft magnetic material can be reduced. Thus, iron loss of the powder magnetic core can be reduced.

In the soft magnetic material according to this embodiment, insulating coatings 20 have insulating coatings 20*a* covering metal magnetic particles 10 and insulating coatings 20*b* covering insulating coatings 20*a*. Insulating coatings 20*a* consist of the iron phosphate compound, and insulating coatings 20*b* consist of the aluminum phosphate compound.

Thus, insulating coatings 20 are in the two-layer structure of insulating coatings 20*a* having excellent adhesiveness with respect to metal magnetic particles 10 and insulating coatings 20*b*, having superior high-temperature stability to insulating coatings 20*a*, covering insulating coatings 20*a*. The adhesiveness between metal magnetic particles 10 and insulating coatings 20 can be improved through insulating coatings 20*a*, and heat resistance of insulating coatings 20 can be improved through insulating coatings 20*b*.

The method of manufacturing a soft magnetic material according to this embodiment is the method of manufacturing the soft magnetic material including composite magnetic particles 30 having metal magnetic particles 10 mainly composed of Fe and insulating coatings 20 covering metal magnetic particles 10, comprising the step of forming insulating coatings 20 covering metal magnetic particles 10. The step of forming insulating coatings 20 includes the following steps: Insulating coatings 20*a* are formed by covering metal magnetic particles 10 with a compound or a solution containing Fe ions and phosphoric acid ions. Insulating coatings 20*b* are formed by covering insulating coatings 20*a* with a compound or a solution containing Al ions and phosphoric acid ions after formation of insulating coatings 20*a*.

According to the method of manufacturing a soft magnetic material according to this embodiment, the contact surfaces of insulating coatings 20 in contact with metal magnetic particles 10 are formed by insulating coatings 20*a* containing the iron phosphate compound. Fe and the iron phosphate compound have high adhesiveness, whereby the adhesiveness between metal magnetic particles 10 and insulating coatings 20 can be improved. Therefore, insulating coatings 20 are hardly broken in the pressure molding, and increase of eddy current loss of the powder magnetic core obtained by pressure-molding this soft magnetic material can be suppressed. Further, the surfaces of insulating coatings 20 are formed by insulating coatings 20*b* containing the aluminum phosphate compound. The aluminum phosphate compound has superior high-temperature stability to insulating coatings 20*a* containing the iron phosphate compound, whereby deterioration of insulation properties is small when the powder magnetic core obtained by pressure-molding this soft magnetic material is heat-treated. Insulating coatings 20*b* also prevent decomposition of insulating coatings 20*a*. Thus, heat resistance of insulating coatings 20 can be improved, and hysteresis loss of the powder magnetic core can be reduced. Thus, iron loss of the powder magnetic core can be reduced.

While the case of forming insulating coatings 20 by wet application processing has been shown in the first embodiment, the present invention is not restricted to this case but insulating coatings 20 may alternatively be formed by mechanical alloying of mechanically mixing a solid-powdery compound of the components of insulating coatings 20 and metal magnetic particles 10 with each other and forming films or sputtering, in place of the wet application processing.

While the case where insulating coatings 20*a* consist of the iron phosphate compound and insulating coatings 20*b* consist of the aluminum phosphate compound has been shown in this embodiment, the present invention is not restricted to this case but insulating coatings 20*a* may simply contain phosphoric acid and Fe, and insulating coatings 20*b* may simply contain phosphoric acid and at least one type of atom selected from the group consisting of Al, Si, Mn, Ti, Zr and Zn.

Second Embodiment

Figure 4:
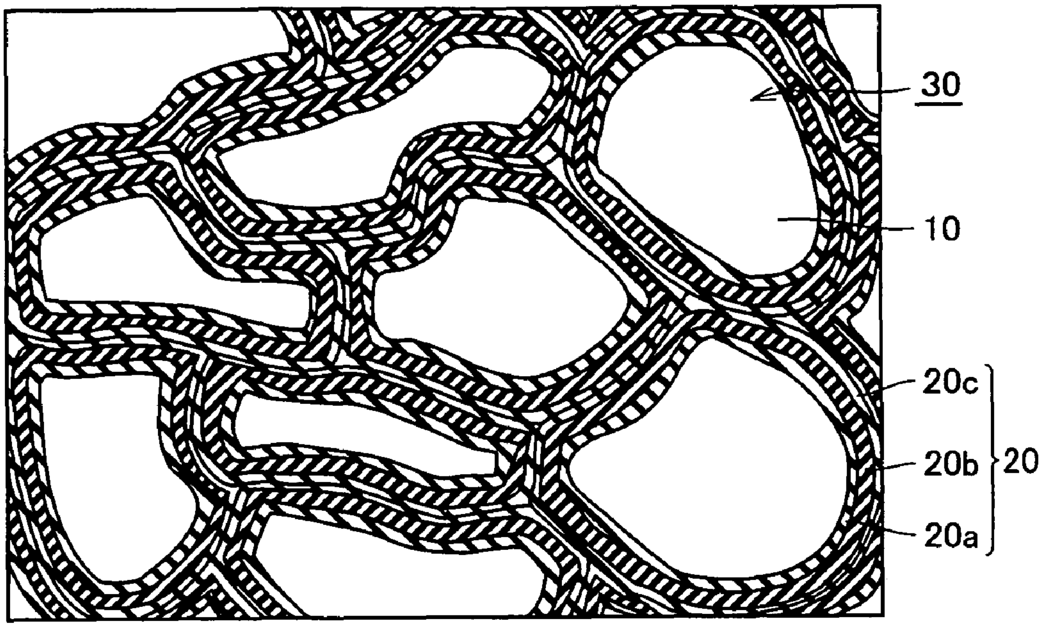
FIG. 4 is a schematic diagram showing a powder magnetic core prepared from a soft magnetic material according to a second embodiment of the present invention in an enlarged manner.

FIG. 4 is a schematic diagram showing a powder magnetic core prepared from a soft magnetic material according to a second embodiment of the present invention in an enlarged manner. As shown in FIG. 4, the powder magnetic core prepared from the soft magnetic material according to this embodiment includes a plurality of composite magnetic particles 30 having metal magnetic particles 10 and insulating coatings 20 covering the surfaces of metal magnetic particles 10. Insulating coatings 20 have insulating coatings 20*a* of an iron phosphate compound, insulating coatings 20*b* of an iron phosphate compound and an aluminum phosphate compound and insulating coatings 20*c* of an aluminum phosphate compound. Insulating coatings 20*a* cover metal magnetic particles 10, insulating coatings 20*b* cover insulating coatings 20*a*, and insulating coatings 20*c* cover insulating coatings 20*b*. In other words, metal magnetic particles 10 are covered with insulating coatings 20 of a three-layer structure.

Figure 5A:
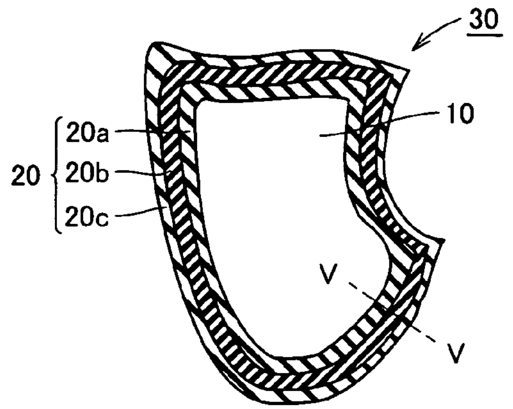
FIG. 5A is an enlarged diagram showing a composite magnetic particle in FIG. 4.
Figure 5B:
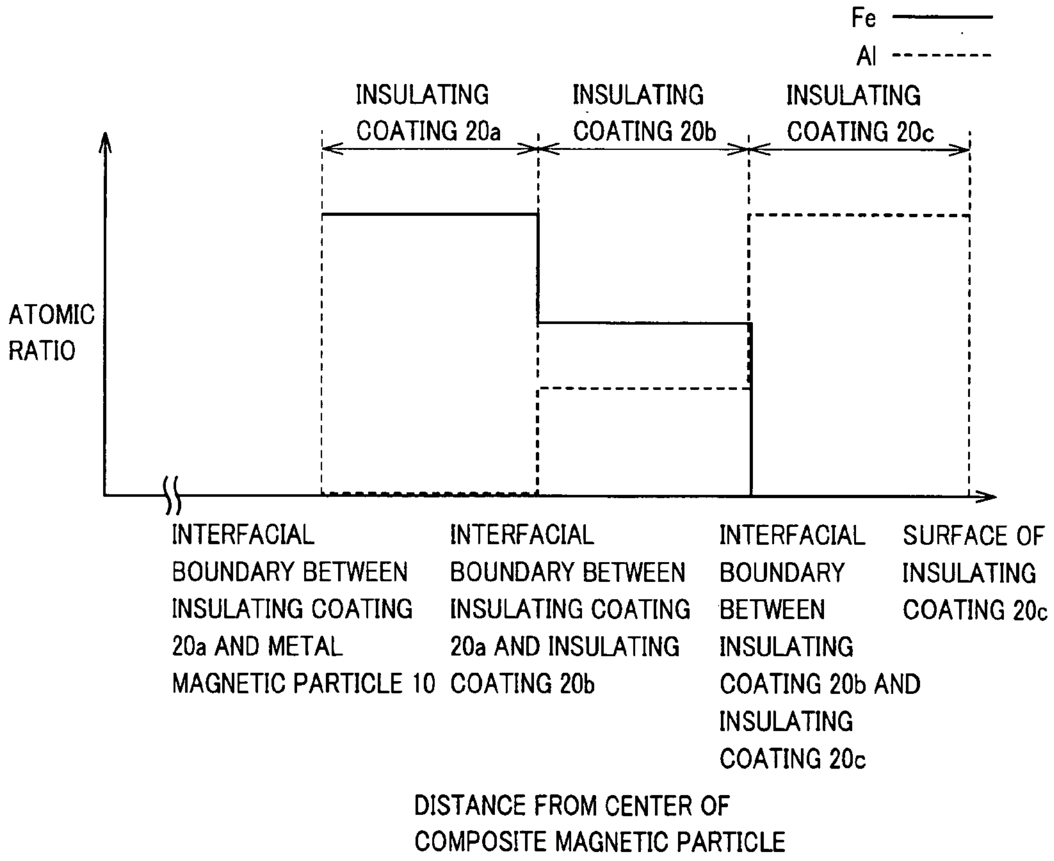
FIG. 5B is a diagram showing changes of an atomic ratio of Fe and an atomic ratio of Al along the line V-V in an insulating coating shown in FIG. 5A.

FIG. 5A is an enlarged view showing a composite magnetic particle in FIG. 4. FIG. 5B is a diagram showing changes of an atomic ratio of Fe and an atomic ratio of Al along the line V-V in the insulating coating shown in FIG. 5A.

Referring to FIGS. 5A and 5B, insulating coating 20*a* contains a constant quantity of Fe, and contains no Al. The atomic ratio of Fe and the atomic ratio of Al discontinuously change on the interfacial boundary between insulating coating 20*a* and insulating coating 20*b*, while insulating coating 20*b* contains Fe in a smaller quantity than that in insulating coating 20*a*, and also contains a constant quantity of Al. The atomic ratio of Fe and the atomic ratio of Al discontinuously change on the interfacial boundary between insulating coating 20*b* and insulating coating 20*c*, while insulating coating 20*c* contains no Fe, and contains Al in a larger quantity than that in insulating coating 20*b*. The atomic ratio of Fe contained in the contact surface of insulating coating 20 in contact with metal magnetic particle 10 is larger than the atomic ratio of Fe contained in the surface of insulating coating 20. Further, the atomic ratio of Al contained in the contact surface of insulating coating 20 in contact with metal magnetic particle 10 is smaller than the atomic ratio of Al contained in the surface of insulating coating 20.

A method of manufacturing the powder magnetic core shown in FIG. 4 is now described.

Figure 6:
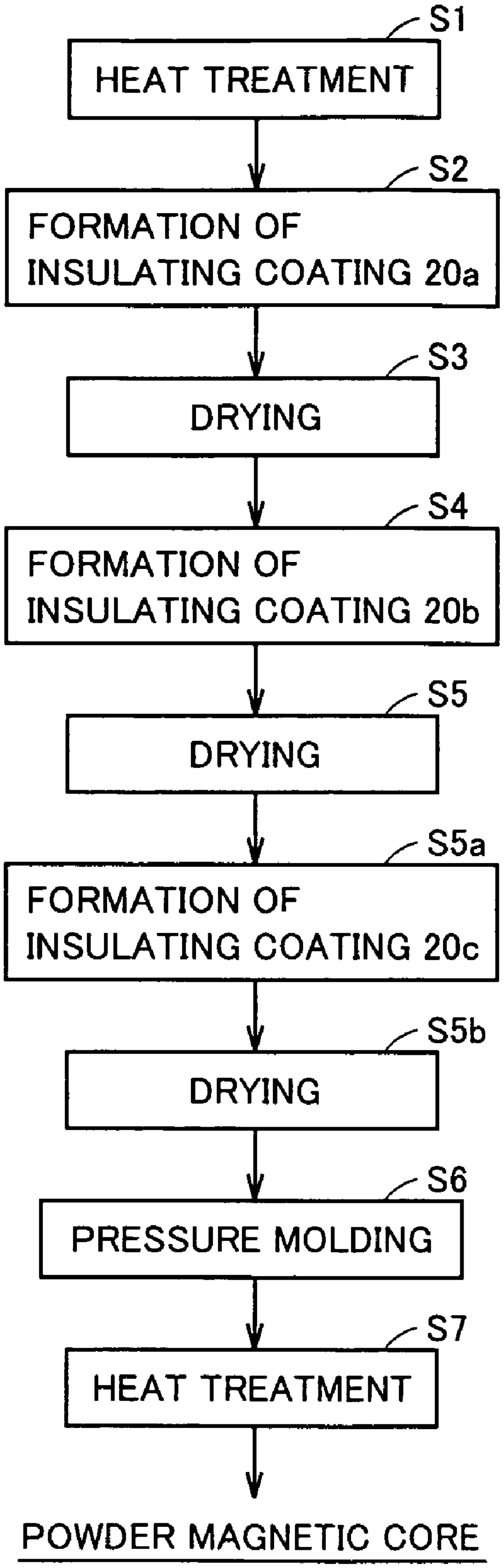
FIG. 6 is a diagram showing a method of manufacturing a powder magnetic core according to the second embodiment of the present invention along the step order.

FIG. 6 is a diagram showing the method of manufacturing a powder magnetic core according to the second embodiment of the present invention along the step order. Referring to FIG. 6, an aqueous solution employed for forming insulating coatings 20*b* in the manufacturing method according to this embodiment is different from that in the first embodiment. Further, this embodiment is different from the first embodiment in a point of forming insulating coatings 20*c* (step S5*a*) and drying insulating coatings 20*c* (step S5*b*) after drying (step S5) insulating coatings 20*b*.

More specifically, an aqueous solution containing Fe ions, Al ions and $PO_4$ ions is employed when forming insulating coatings 20*b* (step S4), in place of the aqueous solution containing Al ions and $PO_4$ ions. The concentration of the Fe ions contained in this aqueous solution is smaller than the concentration of Fe ions contained in an aqueous solution having been employed when forming insulating coatings 20*a*. Insulating coatings 20*b* consisting of the iron phosphate compound and the aluminum phosphate compound and containing Fe in a smaller quantity than that in insulating coatings 20*a* can be formed by employing this aqueous solution.

Then, metal magnetic particles 10 covered with insulating coatings 20*b* are dried (step S5). Then, insulating coatings 20*c* of the aluminum phosphate compound are formed by bonderizing, for example (step S5*a*). More specifically, metal magnetic particles 10 formed with insulating coatings 20*b* are dipped in an aqueous solution, so that the aqueous solution is applied to insulating coatings 20*b*. An aqueous solution containing Al ions and $PO_4$ ions is employed as the aqueous solution employed in this embodiment. Thereafter metal magnetic particles 10 covered with insulating coatings 20*c* are dried (step S5*b*).

The remaining structure of the powder magnetic core and the method of manufacturing the same are substantially similar to the structure of the powder magnetic core shown in the first embodiment and the method of manufacturing the same, and hence redundant description is not repeated.

Also when insulating coatings 20 are formed by three-layer insulating coatings 20*a* to 20*c* as in this embodiment, the effects of the present invention can be attained so far as the atomic ratio of Fe contained in the contact surfaces of insulating coatings 20 in contact with metal magnetic particles 10 is larger than the atomic ratio of Fe contained in the surfaces of the insulating coatings and the atomic ratio of aluminum contained in the contact surfaces of insulating coatings 20 in contact with metal magnetic particles 10 is smaller than the atomic ratio of aluminum contained in the surfaces of insulating coatings 20.

Third Embodiment

In a powder magnetic core employing a soft magnetic material according to this embodiment, the atomic ratios of Fe and Al contained in insulating coatings 20*a* to 20*c* are different from those in the case of the second embodiment. In other words, insulating coatings 20 have insulating coatings 20*a* of an iron phosphate compound and an aluminum phosphate compound, insulating coatings 20*b* of an iron phosphate compound and insulating coatings 20*c* of an aluminum phosphate compound.

Figure 7:
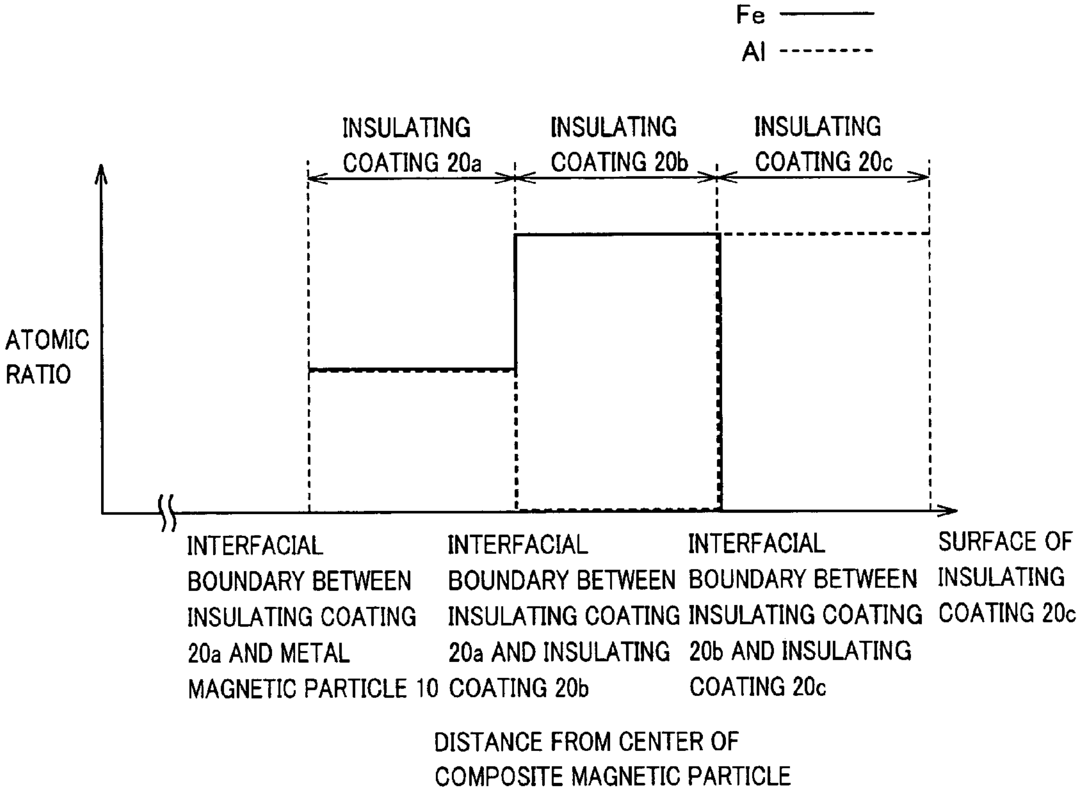
FIG. 7 is a diagram showing changes of an atomic ratio of Fe and an atomic ratio of Al along the line V-V in FIG. 5A in an insulating coating according to a third embodiment of the present invention.

FIG. 7 is a diagram showing changes of the atomic ratio of Fe and the atomic ratio of Al along the line V-V in FIG. 5A in the insulating coatings according to the third embodiment of the present invention. Referring to FIG. 7, insulating coating 20*a* contains constant quantities of Fe and Al. The atomic ratio of Fe and the atomic ratio of Al discontinuously change in the interfacial boundary between insulating coating 20*a* and insulating coating 20*b*, while insulating coating 20*b* contains Fe in a lager quantity than that in insulating coating 20*a*, and contain no Al. Further, the atomic ratio of Fe and the atomic ratio of Al discontinuously change on the interfacial boundary between insulating coating 20*b* and insulating coating 20*c*, while insulating coating 20*c* contains no Fe, and contains Al in a larger quantity than that in insulating coating 20*a*. The atomic ratio of Fe contain in the contact surface of insulating coating 20 in contact with metal magnetic particle 1O is larger than the atomic ratio of Fe contained in the surface of insulating coating 20. Further, the atomic ratio of Al contained in the contact surface of insulating coating 20 in contact with metal magnetic particle 10 is smaller than the atomic ratio of Al contained in the surface of insulating coating 20.

In a method of manufacturing the soft magnetic material according to this embodiment, aqueous solutions employed in formation of insulating coatings 20*a* and 20*b* are different from those in the second embodiment. More specifically, an aqueous solution containing Fe ions, Al ions and $PO_4$ ions is employed when forming insulating coatings 20*a* (step S2), in place of the aqueous solution containing Fe ions and $PO_4$ ions. The concentration of the Al ions contained in this aqueous solution is smaller than the concentration of Al ions contained in an aqueous solution employed when forming insulating coatings 20*c*. Insulating coatings 20*a* of the iron phosphate compound and the aluminum phosphate compound can be formed by employing this aqueous solution. When forming insulating coatings 20*b* (step S4), an aqueous solution containing Fe ions and $PO_4$ ions is employed in place of the aqueous solution containing Fe ions, Al ions and $PO_4$ ions. Insulating coatings 20*b* of the iron phosphate compound can be formed by employing this aqueous solution.

The remaining structure of the powder magnetic core and the method of manufacturing the same are substantially similar to the structure of the powder magnetic core shown in the second embodiment and the method of manufacturing the same, and hence redundant description is not repeated.

Also when insulating coatings 20 are formed by three-layer insulating coatings 20*a* to 20*c*, the atomic ratio of Fe contained in insulating coatings 20*b* is larger than the atomic ratio of Fe contained in insulating coatings 20*a* and the atomic ratio of Al contained in insulating coatings 20*b* is smaller than the atomic ratio of Al contained in insulating coatings 20*a* as in this embodiment, the effects of the present invention can be attained so far as the atomic ratio of Fe contained in the contact surfaces of insulating coatings 20 in contact with metal magnetic particles 10 is larger than the atomic ratio of Fe contained in the surfaces of the insulating coatings and the atomic ratio of aluminum contained in the contact surfaces of insulating coatings 20 in contact with metal magnetic particles 10 is smaller than the atomic ratio of aluminum contained in the surfaces of insulating coatings 20.

Fourth Embodiment

Figure 8:
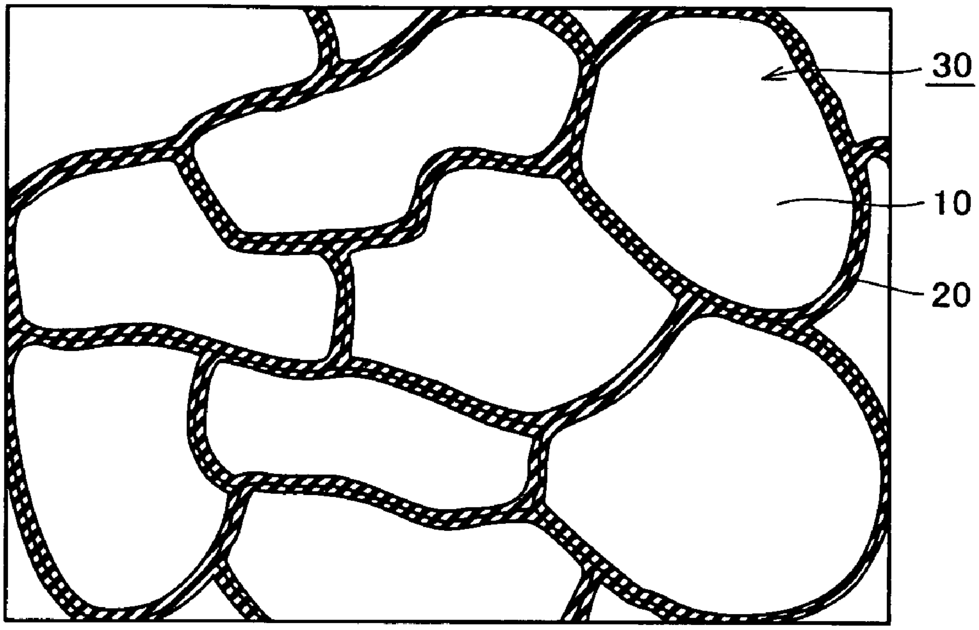
FIG. 8 is a schematic diagram showing a powder magnetic core prepared from a soft magnetic material according to a fourth embodiment of the present invention in an enlarged manner.

FIG. 8 is a schematic diagram showing a powder magnetic core prepared from a soft magnetic material according to a fourth embodiment of the present invention in an enlarged manner. As shown in FIG. 8, the powder magnetic core prepared from the soft magnetic material according to this embodiment includes a plurality of composite magnetic particles 30 having metal magnetic particles 10 and insulating coatings 20 covering the surfaces of metal magnetic particles 10. Insulating coatings 20 are single insulating coatings of an iron phosphate compound and an aluminum phosphate compound.

Figure 9A:
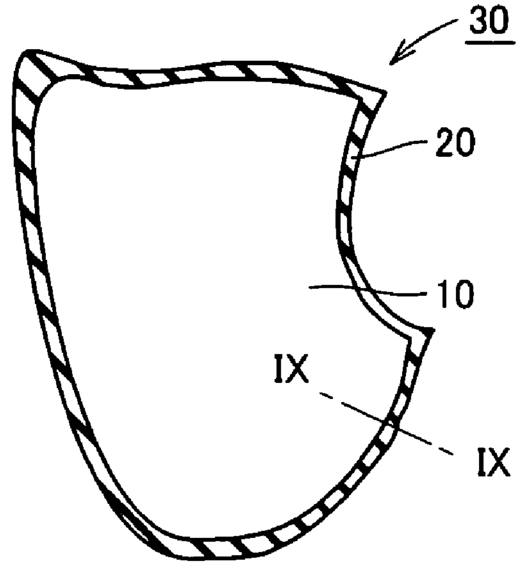
FIG. 9A is an enlarged diagram showing a composite magnetic particle in FIG. 8.
Figure 9B:
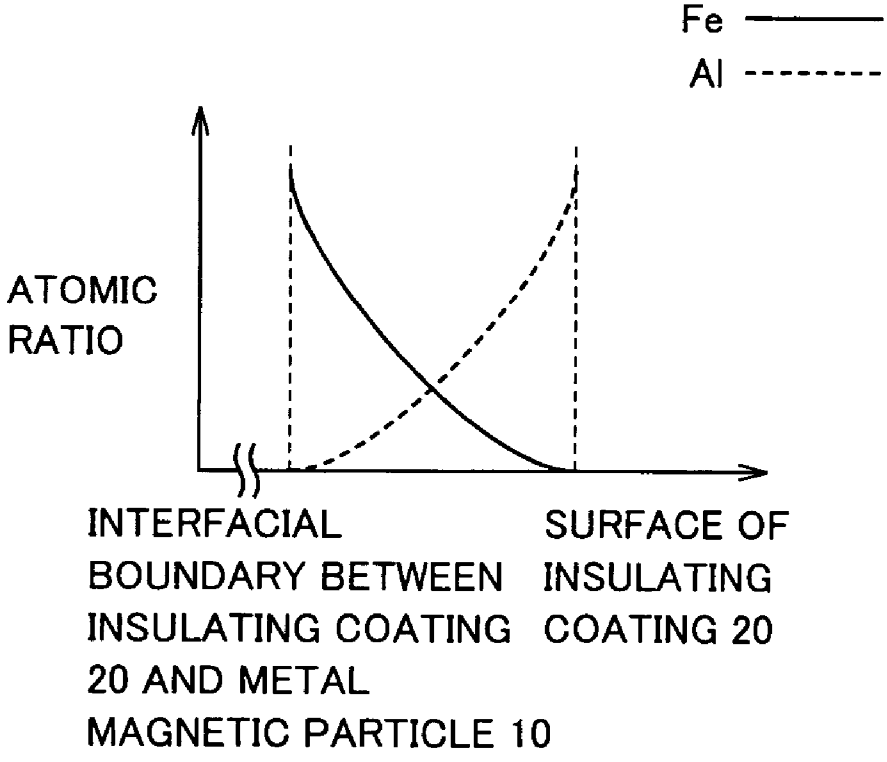
FIG. 9B is a diagram showing changes of an atomic ratio of Fe and an atomic ratio of Al along the line IX-IX in an insulating coating shown in FIG. 9A.

FIG. 9A is an enlarged view showing a composite magnetic particle in FIG. 8. FIG. 9B is a diagram showing changes of an atomic ratio of Fe and an atomic ratio of Al along the line IX-IX in the insulating coating shown in FIG. 9A.

Referring to FIGS. 9A and 9B, the atomic ratio of Fe monotonously decreases from a contact surface in contact with metal magnetic particle 10 toward the surface of insulating coating 20. The atomic ratio of Al monotonously increases from the contact surface in contact with metal magnetic particle 10 toward the surface of insulating coating 20. In other words, the atomic ratio of Fe contained in the contact surface of insulating coating 10 in contact with metal magnetic particle 10 is larger than the atomic ratio of Fe contained in the surface of insulating coating 20. Further, the atomic ratio of Al contained in the contact surface of insulating coating 20 in contact with metal magnetic particle 10 is smaller than the atomic ratio of Al contained in the surface of insulating coating 20.

A method of preparing the powder magnetic core shown in FIG. 8 from the soft magnetic material is now described.

Figure 10:
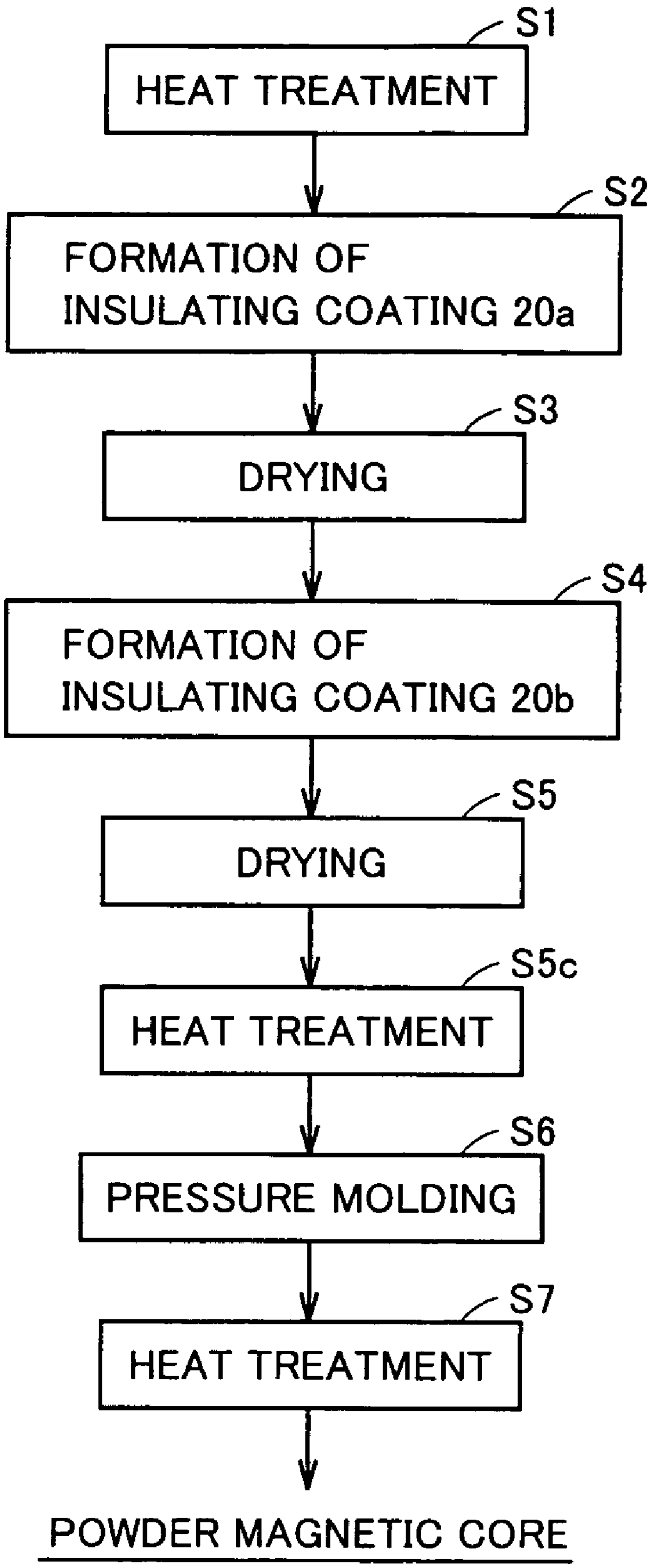
FIG. 10 is a diagram showing a method of manufacturing a powder magnetic core according to the fourth embodiment of the present invention along the step order.

FIG. 10 is a diagram showing a method of manufacturing the powder magnetic core according to the fourth embodiment of the present invention along the step order. Referring to FIG. 10, the manufacturing method according to this embodiment is different from the first embodiment in a point of heat-treating insulating coatings 20*a* and 20*b* (step S5*c*) after drying insulating coatings 20*b* (step S5).

More specifically, after metal magnetic particles 10 covered with insulating coatings 20*b* are dried (step S5), insulating coatings 20*a* and 20*b* are heat-treated at a temperature of 250° C. for 5 hours, for example (step S5*c*). Thus, Fe atoms in insulating coatings 20*a* diffuse into insulating coatings 20*b*, and Al atoms in insulating coatings 20*b* diffuse into insulating coatings 20*a*. Consequently, the boundaries between insulating coatings 20*a* and insulating coatings 20*b* disappear, to form single insulating coatings 20.

The remaining structure of the powder magnetic core and the method of manufacturing the same are substantially similar to the structure of the powder magnetic core shown in the first embodiment and the method of manufacturing the same, and hence redundant description is not repeated.

Also when insulating coatings 20 are formed by single-layer insulating coatings 20 as in this embodiment, the effects of the present invention can be attained so far as the atomic ratio of Fe contained in the contact surfaces of insulating coatings 20 in contact with metal magnetic particles 10 is larger than the atomic ratio of Fe contained in the surfaces of the insulating coatings and the atomic ratio of aluminum contained in the contact surfaces of insulating coatings 20 in contact with metal magnetic particles 10 is smaller than the atomic ratio of aluminum contained in the surfaces of insulating coatings 20.

Fifth Embodiment

Figure 11:
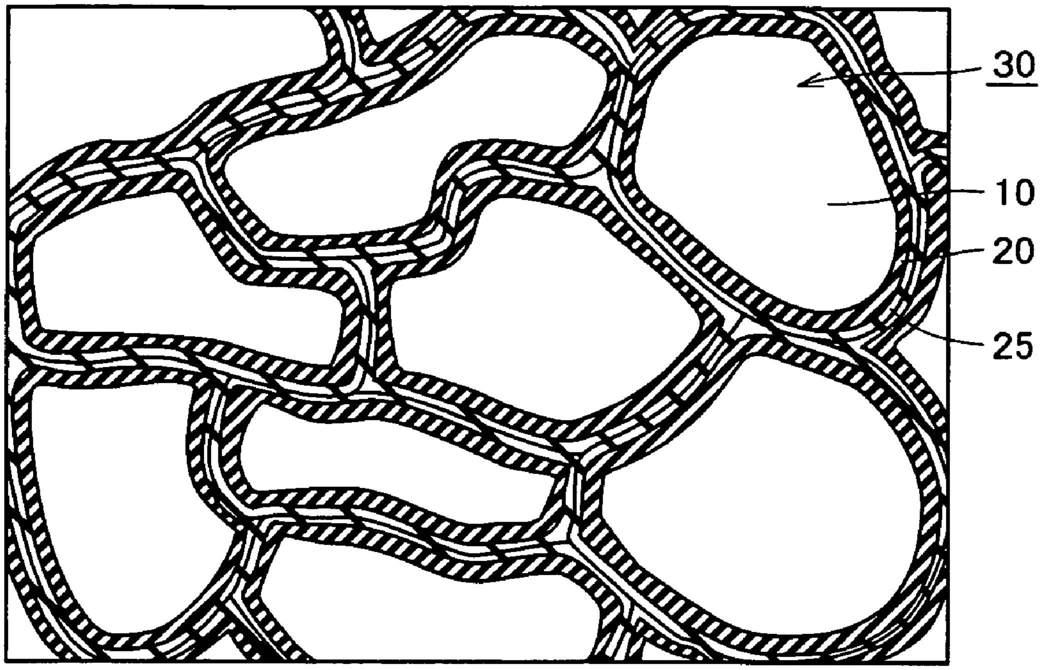
FIG. 11 is a schematic diagram showing a powder magnetic core prepared from a soft magnetic material according to a fifth embodiment of the present invention in an enlarged manner.

FIG. 11 is a schematic diagram showing a powder magnetic core prepared from a soft magnetic material according to a fifth embodiment of the present invention in an enlarged manner. As shown in FIG. 11, the powder magnetic core prepared from the soft magnetic material according to this embodiment includes a plurality of composite magnetic particles 30 having metal magnetic particles 10, insulating coatings 20 covering the surfaces of metal magnetic particles 10 and coatings 25 of silicone resin covering insulating coatings 20.

A method of manufacturing the powder magnetic core shown in FIG. 11 is now described.

Figure 12:
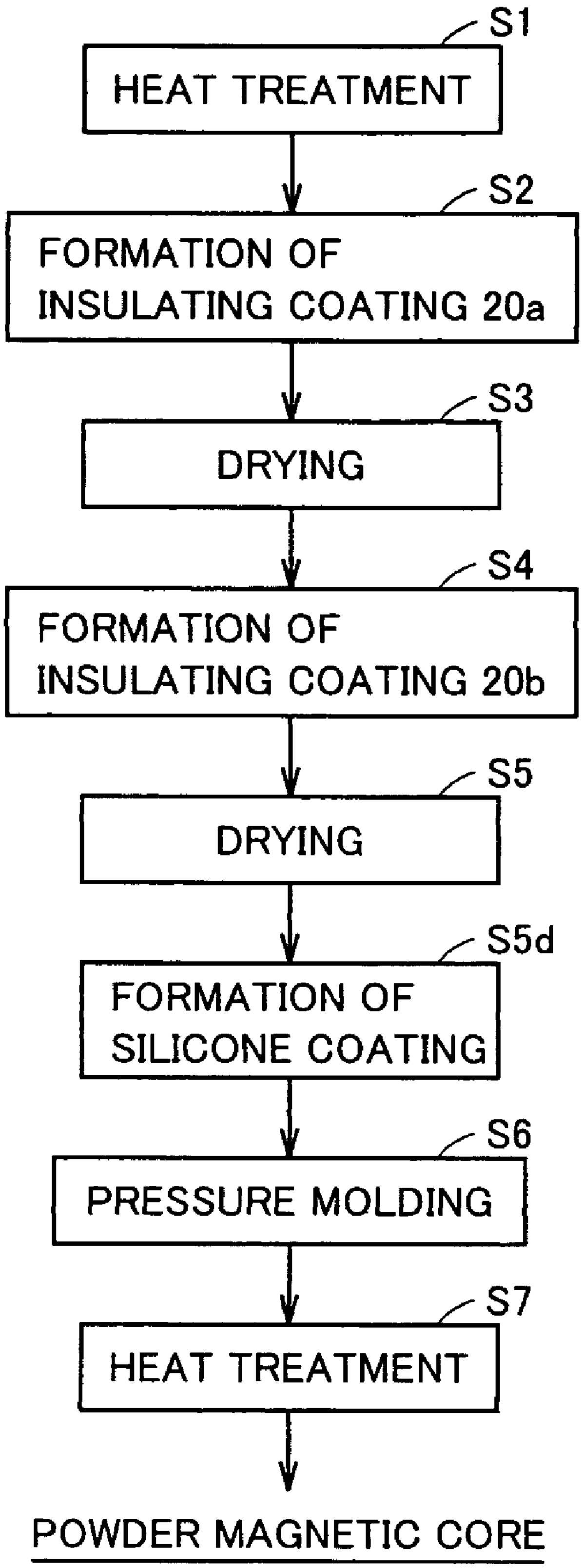
FIG. 12 is a diagram showing a method of manufacturing a powder magnetic core according to the fifth embodiment of the present invention along the step order.

FIG. 12 is a diagram showing the method of manufacturing a powder magnetic core according to the fifth embodiment of the present invention along the step order. Referring to FIG. 12, the manufacturing method according to this embodiment is different from the first embodiment in a point of forming coatings 25 of silicone resin (step S5*d*) after drying insulating coatings 20*b* (step S5).

More specifically, after metal magnetic particles 10 covered with insulating coatings 20*b* are dried (step S5), metal magnetic particles 10 covered with insulating coatings 20*b* and a paint containing silicone resin and a pigment are mixed with each other. Alternatively, the paint containing silicone resin and the pigment is sprayed on metal magnetic particles 10 covered with insulating coatings 20*b*. Thereafter the paint is dried, and a solvent is removed. Thus, coatings 25 of silicone resin are formed.

The remaining structure of the powder magnetic core and the method of manufacturing the same are substantially similar to the structure of the powder magnetic core shown in the first embodiment and the method of manufacturing the same, and hence redundant description is not repeated.

In the soft magnetic material according to this embodiment, composite magnetic particles 30 further have coatings 25 of silicone resin covering the surfaces of insulating coatings 20. Thus, coatings 25 ensure insulation between metal magnetic particles 10, whereby increase of eddy current loss in the powder magnetic core obtained by pressure-molding this soft magnetic material can be further suppressed.

While the case of forming coatings 25 of silicone resin has been shown in this embodiment, the present invention is not restricted to this case but coatings containing Si may simply be formed.

While the case where insulating coatings 20 contain the aluminum phosphate compound has been shown in each of the first to fifth embodiments, the effects of the present invention can be attained also when insulating coatings 20 contain a manganese phosphate compound or a zinc phosphate compound in place of the aluminum phosphate compound. Insulating coatings 20 containing this compound can be formed by employing an aqueous solution containing Si ions and $PO_4$ ions, an aqueous solution containing Mn ions and $PO_4$ ions, an aqueous solution containing Ti ions and $PO_4$ ions, an aqueous solution containing Zr ions and $PO_4$ ions or an aqueous solution containing Zn ions and $PO_4$ ions in place of the aqueous solution containing Al ions and $PO_4$ ions.

Sixth Embodiment

Figure 13A:
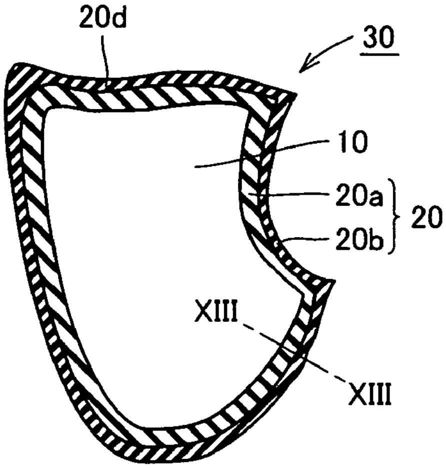
FIG. 13A is an enlarged view showing a composite magnetic particle in a sixth embodiment of the present invention.
Figure 13B:
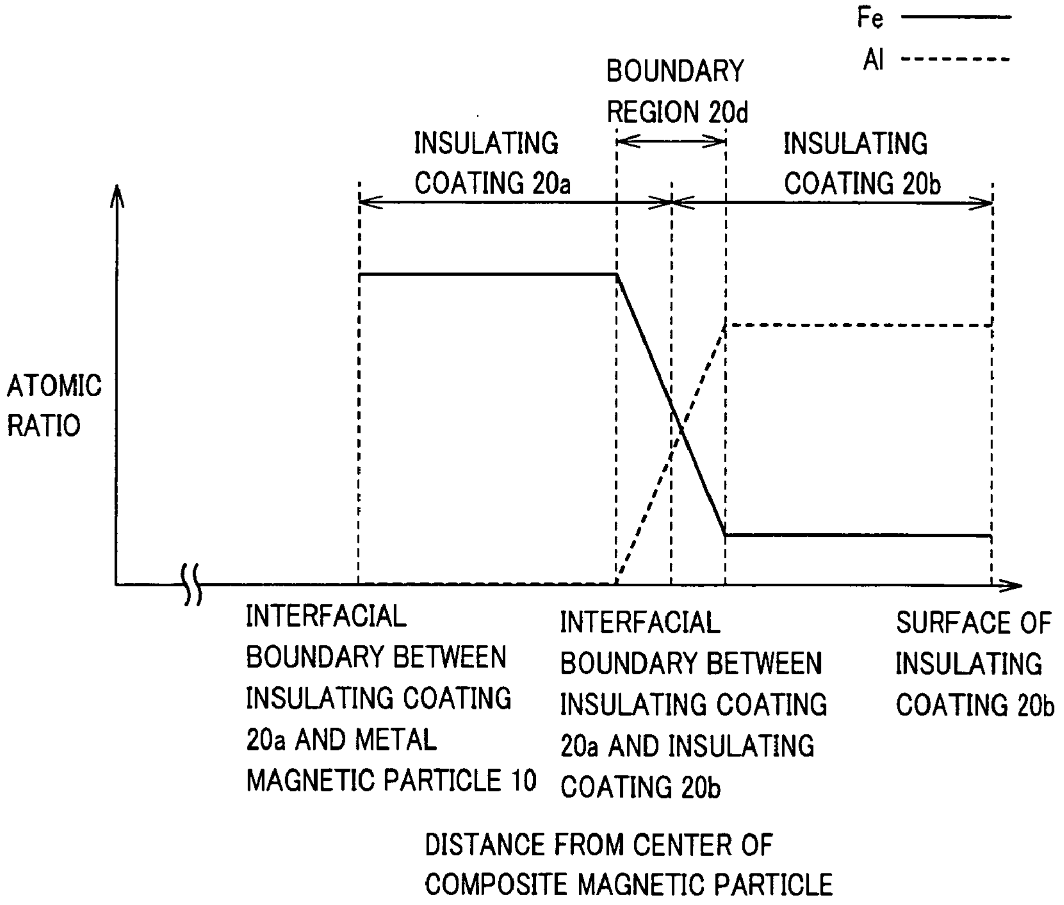
FIG. 13B is a diagram showing changes of an atomic ratio of Fe and an atomic ratio of Al along the line XIII-XIII in an insulating coating shown in FIG. 13A.

FIG. 13A is an enlarged view showing a composite magnetic particle in a sixth embodiment of the present invention. FIG. 13B is a diagram showing changes of an atomic ratio of Fe and an atomic ratio of Al along the line XIII-XIII in an insulating coating shown in FIG. 13A. Referring to FIGS. 13A and 13B, the atomic ratios of Fe and Al contained in insulating coatings 20*a* and 20*b* are different from those in the case of the first embodiment in a powder magnetic core employing a soft magnetic material according to this embodiment. In other words, an insulating coating 20 has insulating coating 20*a* formed through reaction between iron and phosphoric acid present on the surface of a metal magnetic particle 10 and insulating coating 20*b* of phosphoric acid and an aluminum compound.

Insulating coating 20*a* contains a constant quantity of Fe, and contains no Al. The atomic ratio of Fe decreases and the atomic ratio of Al increases on a boundary region 20*d* between insulating coating 20*a* and insulating coating 20*b*. Insulating coating 20*b* contains Fe in a smaller quantity than that in insulating coating 20*a*, and also contains a constant quantity of Al. The atomic ratio of Fe contained in a contact surface of insulating coating 20 in contact with metal magnetic particle 20 is larger than the atomic ratio of Fe contained in the surface of insulating coating 20. Further, the atomic ratio of Al contained in the contact surface of insulating coating 20 in contact with metal magnetic particle 10 is smaller than the atomic ratio of Al contained in the surface of insulating coating 20.

A method of manufacturing the powder magnetic core shown in FIG. 13 is now described.

Figure 14:
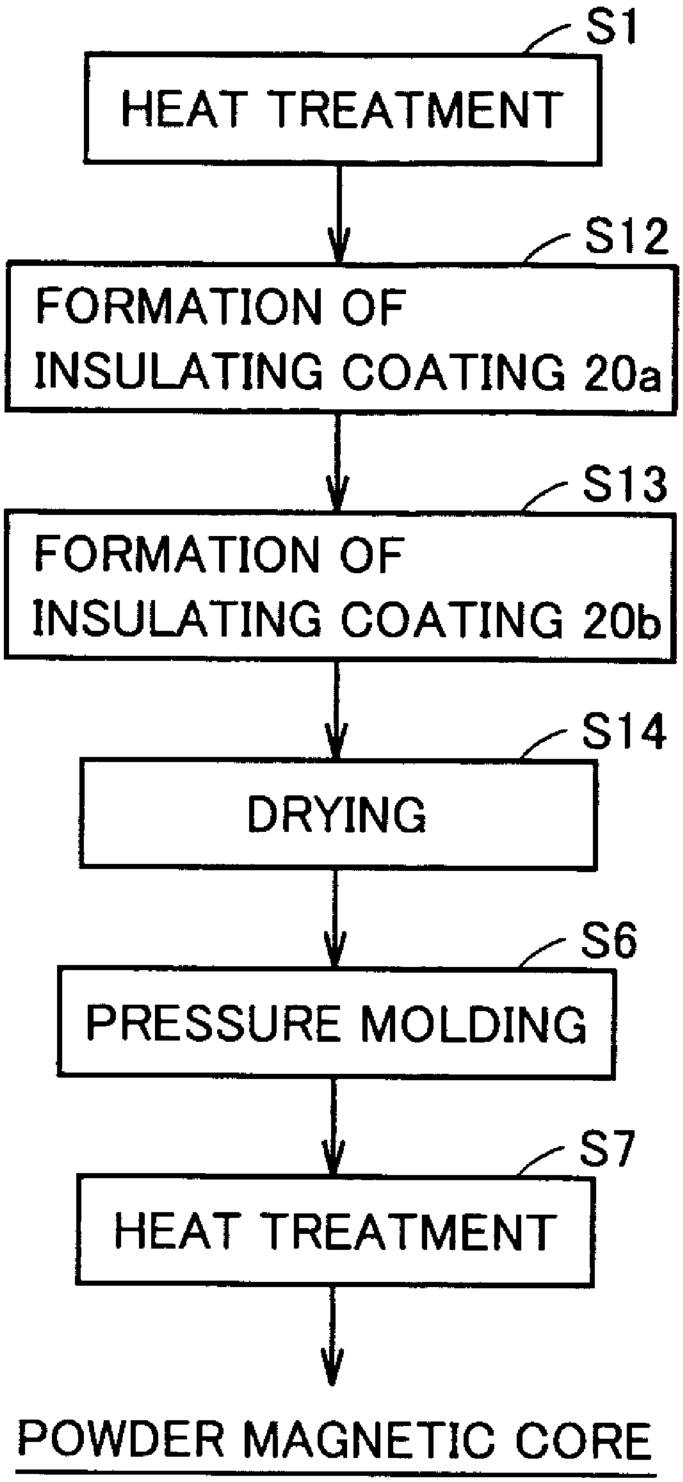
FIG. 14 is a diagram showing a method of manufacturing a powder magnetic core according to the sixth embodiment of the present invention along the step order.

FIG. 14 is a diagram showing the method of manufacturing the powder magnetic core according to the sixth embodiment of the present invention along the step order. Referring to FIG. 14, a method of forming insulating coating 20 and subsequent treatment are different from those of the first embodiment in the manufacturing method according to this embodiment.

According to this embodiment, a phosphoric acid solution is added into a suspension prepared by dispersing metal magnetic particles 10 in an organic solvent and mixed/stirred after heat-treating metal magnetic particles 10 (step S1). Thus, iron present on the surfaces of metal magnetic powder 10 and phosphoric acid react with each other to form insulating coatings 20*a* on the surfaces of metal magnetic particles 10 (step S12). Then, a solution of phosphoric acid and at least one type of metal alkoxide containing atoms selected from a group consisting of Al, Si, Ti and Zr is added to the suspension having been employed for forming insulating coatings 20 and mixed/stirred. At this time, the metal alkoxide reacts with water to hydrolyze, thereby generating a metal oxide or a metal-containing hydroxide. Thus, insulating coatings 20*b* of phosphoric acid and a metal compound are formed on the surfaces of metal magnetic particles 10 (step S13). Then, metal magnetic particles 10 covered with insulating coatings 20 are dried (step S14). More specifically, the metal magnetic particles are dried in a draft of the room temperature for 3 to 24 hours and thereafter dried in the temperature range of 60 to 120° C., or dried under a decompressed atmosphere in the temperature range of 30 to 80° C. The metal magnetic particles, dryable in the air or under an inert gas atmosphere of $N_2$ gas or the like, are preferably dried under the inert gas atmosphere of $N_2$ gas, in consideration of prevention of oxidation of the metal magnetic particles. Thus, the soft magnetic material according to this embodiment is obtained.

The organic solvent employed in this embodiment may simply be a generally employed organic solvent, and a water-soluble organic solvent is preferable. More specifically, an alcoholic solvent such as ethyl alcohol, propyl alcohol or butyl alcohol, a ketonic solvent such as acetone or methyl ethyl ketone, a glycol etheric solvent such as methyl cellosolve, ethyl cellosolve, propyl cellosolve or butyl cellosolve, oxyethylene such as diethylene glycol, triethylene glycol, polyethylene glycol, dipropylene glycol, tripropylene glycol or polypropylene glycol, an oxypropylene addition polymer, alkylene glycol such as ethylene glycol, propylene glycol or 1,2,6-hexanetriol, glycerin or 2-pyrrolidone. In particular, the alcoholic solvent such as ethyl alcohol, propyl alcohol or butyl alcohol or the ketonic solvent such as acetone or methyl ethyl ketone is preferable.

The phosphoric acid employed in this embodiment may simply be an acid prepared by hydration of diphosphorus pentaoxide. More specifically, metaphosphoric acid, pyrophosphoric acid, orthophosphoric acid, triphosphoric acid or tetraphosphoric acid is available. Orthophosphoric acid is particularly preferable.

The metal alkoxide employed in this embodiment is an alkoxide containing atoms selected from the group consisting of Al, Si, Ti and Zr. Methoxide, ethoxide, propoxide, isopropoxide, oxyisopropoxide or butoxide can be employed as the alkoxide. Further, ethyl silicate or methyl silicate obtained by partially hydrolyzing/condensing tetraethoxysilane or tetramethoxysilane can be employed as the alkoxide. In consideration of homogeneity of treatment and the effect of the treatment, tetraethoxysilane, tetramethoxysilane, methyl silicate, aluminum triisopropoxide, aluminum tributoxide, zirconium tetraisopropoxide or titanium tetraisopropoxide is particularly preferably employed as the alkoxide.

As an apparatus for mixing the metal magnetic particle powder with the phosphoric acid solution and the metal alkoxide solution, a high-speed agitator mixer is used, for example, and more specifically, a Henschel mixer, a speed mixer, a ball cutter, a powder mixer, a hybrid mixer or a cone blender is used.

The metal magnetic particle powder and the phosphoric acid solution as well as the metal alkoxide solution are preferably mixed/stirred at a temperature of at least the room temperature and not more than the boiling point of the employed organic solvent. In view of prevention of oxidation of the metal magnetic particle powder, reaction is preferably performed under an inert gas atmosphere of $N_2$ gas or the like.

The remaining method of manufacturing the powder magnetic core is substantially similar to the structure of the powder magnetic core shown in the first embodiment and the method of manufacturing the same, and hence redundant description is not repeated.

According to the soft magnetic material according to this embodiment, effects similar to those of the first embodiment can be attained.

EXAMPLE 1

Example of the present invention now described. According to this Example, effects of reducing iron loss and improving heat resistance in a powder magnetic core obtained by pressure-molding a soft magnetic material according to the present invention were examined. First, samples 1 to 6 of soft magnetic materials were prepared by the following methods:

Sample 1 (Inventive Example): Prepared according to the manufacturing method of the first embodiment. More specifically, ABC100.30 by Hoeganaes AB having iron purity of at least 99.8% was prepared as metal magnetic particles 10 and dipped in an iron phosphate solution, thereby forming insulating coatings 20*a* of an iron phosphate compound on the surfaces of metal magnetic particles 10 with an average thickness of 50 nm. Then, the metal magnetic particles were dipped in an aluminum phosphate solution, thereby forming insulating coatings 20*b* of an aluminum phosphate compound on the surfaces of insulating coatings 20*a* with an average thickness of 50 nm, for obtaining a soft magnetic material forming sample 1.

Sample 2 (Inventive Example): Prepared according to the manufacturing method of the fifth embodiment. More specifically, a soft magnetic material obtained by a method similar to the manufacturing method for sample 1 was prepared, and this soft magnetic material was dipped in a solution prepared by dissolving and dispersing silicone resin into ethyl alcohol. Thus, coatings 25 of silicone resin having an average thickness of 100 nm were formed on the surfaces of insulating coatings 20, for obtaining the soft magnetic material forming sample 2.

Sample 3 (comparative example): Only insulating coatings of an iron phosphate compound were formed. More specifically, ABC100.30 by Hoeganaes AB was prepared as metal magnetic particles and dipped in an iron phosphate solution, thereby forming insulating coatings of an iron phosphate compound on the surfaces of the metal magnetic particles with an average thickness of 100 nm, for obtaining the soft magnetic material forming sample 3.

Sample 4 (comparative example): Only insulating coatings of an aluminum phosphate compound were formed. More specifically, ABC100.30 by Hoeganaes AB was prepared as metal magnetic particles and dipped in an aluminum phosphate solution, thereby forming insulating coatings of an aluminum phosphate compound on the surfaces of metal magnetic particles 10 with an average thickness of 100 nm, for obtaining the soft magnetic material forming sample 4.

Sample 5 (Inventive Example): A phosphoric acid solution (phosphoric acid content: 85 weight %) was dropped into a suspension prepared by suspending ABC100.30 by Hoeganaes AB having iron purity of at least 99.8% into acetone, and stirred/mixed for 20 minutes under an $N_2$ stream at a reaction temperature of 45° C. Then, an acetone solution in which aluminum isopropoxide was dispersed was added to the said mixed solution followed by addition of tetraethoxysilane, and stirred/mixed for 20 minutes. The obtained mixed solution was dried under reduced pressure at 45° C., for obtaining the soft magnetic material forming sample 5.

Sample 6 (Inventive Example): Insulating coatings of silicone were formed on the surfaces of the insulating coatings of sample 5. More specifically, coatings of silicone resin having an average thickness of 100 nm were formed on the surfaces of the insulating coatings of sample 5, for obtaining the soft magnetic material forming sample 6.

Then, the abundance ratio of each atom in the depth direction was measured through "X-ray photoelectron spectrometer ESCA3500" (Shimadzu Corporation) while performing etching by high-speed Ar ion etching as to the prepared samples 1 to 6. Each sample was cut by FIB (Focused Ion Beam), and the composition of a section of insulating coating 20 was analyzed through EDX (Energy-Dispersive X-ray diffraction). As to evaluation of the composition, the peak areas of Kα spectra of the respective elements P, Fe and Al were measured for employing the ratio between the Fe peak area and the P peak area and the ratio between the Al peak area and the P peak area (Fe/P atom abundance ratio and Al/P atom abundance ratio) as indices.

The heat resistance of each soft magnetic material was obtained by the following method: First, 0.5 g of sample powder was weighed out and pressure-molded through a KBr tablet molder (Shimadzu Corporation) with a pressure of 13.72 MPa, for preparing a cylindrical measured sample. Then, the measured sample was exposed under an environment of a temperature of 25° C. and a relative humidity of 60% for at least 12 hours, and thereafter this measured sample was set between stainless steel electrodes, for applying a voltage of 15 V and measuring the resistance value R (mΩ) with an electric resistance measuring apparatus (model 4329A by Yokogawa-Hokushin Electric Corporation).

Then, the area A ($cm^2$) of the upper surface of the measured (cylindrical) sample and the thickness t0 (cm) thereof were measured, for obtaining the specific volume resistance (mΩ·cm) by introducing each measured value into the following expression 1:

$$\text{Specific Volume Resistance (m}\Omega\cdot\text{cm)}=R\times(A/t0) \qquad (1)$$

The aforementioned measured sample was introduced into an electric furnace for performing heating treatment for one hour at each temperature while varying the temperature of the electric furnace to various levels, measuring the specific volume resistances before and after the heating at each temperature, obtaining the rate of change of the specific volume resistance by introducing the specific volume resistances before and after heating into the following expression 2, employing a semilogarithmic graph for plotting the heating temperature and the rate of change of the specific volume resistance on the axes of abscissas and ordinates respectively and regarding the temperature at which the rate of change of the specific volume resistance just reached 10% as the heat-resistant temperature of the soft magnetic material:

$$\text{Rate of Change of Specific Volume Resistance before and after Heating (\%)}=\{\text{Specific Volume Resistance (before Heating)}-\text{Specific Volume Resistance (after Heating)}\}/\text{Specific Volume Resistance (before Heating)}\times 100 \qquad (2)$$

Then, samples 1 to 6 were pressure-molded under a pressure of 1275 MPa, for preparing ringlike powder magnetic cores. Then, heat treatment was performed in a nitrogen atmosphere at a temperature of 550° C. for one hour. Eddy current loss coefficients b were evaluated by measuring iron loss at an excited magnetic flux density of 1.0 (T) as to samples 1 to 6 while varying the frequency. Table 1 shows the average thicknesses of iron phosphate compounds, the average thicknesses of aluminum phosphate compounds, the average thicknesses of silicone resin and the eddy current loss coefficients b as to samples 1 to 6. The eddy current loss coefficient b is a constant b in a case of expressing iron loss W as follows:

$$W=a\times f+b\times f^2 \quad (f=\text{frequency}, a, b\text{: constants})$$

TABLE I

| | Characteristics of Soft Magnetic Material | | | | | | |
|---|---|---|---|---|---|---|---|
| Sample | Average Thickness of Insulating Coating 20a (nm) | Average Thickness of Insulating Coating 20b (nm) | Method of Applying Insulating Coating | Average Thickness of Silicone Resin Coating (nm) | Fe/P Atom Abundance Ratio On Contact Surface between Metal Magnetic Particle 10 and Insulating Coating 20a (−) | Fe/P Atom Abundance Ratio on Surface of Insulating Coating (−) | Al/P Atom Abundance Ratio On Contact Surface between Metal Magnetic Particle 10 and Insulating Coating 20a (−) |
| Sample 1 | 50 | 50 | dipped in phosphate solution (chemical conversion) | 0 | 13.5 | 0.9 | <0.1 |

TABLE I-continued

| | | | | | | | |
|---|---|---|---|---|---|---|---|
| Sample 2 | 50 | 50 | dipped in phosphate solution (chemical conversion) | 100 | 13.4 | 0.9 | <0.1 |
| Sample 3 | 100 | 0 | dipped in phosphate solution (chemical conversion) | 0 | 14.3 | 11.3 | <0.1 |
| Sample 4 | 0 | 100 | dipped in phosphate solution (chemical conversion) | 0 | 4.2 | 2.8 | 2.5 |
| Sample 5 | 50 | 50 | reaction between phosphoric acid and metal alkoxide | 0 | 12.9 | 3.3 | 0.7 |
| Sample 6 | 50 | 50 | reaction between phosphoric acid and metal alkoxide | 100 | 13.6 | 3.0 | 0.8 |

| | Characteristics of Soft Magnetic Material | | Characteristics of Powder Magnetic Core at Heat-Resistant Temperature | | | |
|---|---|---|---|---|---|---|
| Sample | Al/P Atom Abundance Ratio on Surface of Insulating Coating (−) | Heat Resistance (° C.) | Hysteresis Loss Coefficient a at Heat-Resistant Temperature (Excited Magnetic Flux = 1.0 T) ($\times 10^{-3}$ W · s/kg) | Eddy Current Loss Coefficient b at Heat-Resistant Temperature (Excited Magnetic Flux = 1.0 T) ($\times 10^{-3}$ W · $s^2$kg) | Iron Loss at Heat-Resistant Temperature (Excited Magnetic Flux = 1.0 T, Frequency = 1 kHz) (W/kg) | Remarks |
| Sample 1 | 2.6 | 520 | 95 | 0.025 | 120 | inventive example |
| Sample 2 | 2.6 | 580 | 76 | 0.021 | 97 | inventive example |
| Sample 3 | <0.1 | 420 | 126 | 0.022 | 148 | comparative example |
| Sample 4 | 2.4 | 550 | 88 | 0.048 | 136 | comparative example |
| Sample 5 | 2.2 | 530 | 91 | 0.024 | 115 | inventive example |
| Sample 6 | 2.0 | 620 | 72 | 0.016 | 88 | inventive example |

As shown in Table 1, the eddy current loss coefficient b of sample 1 was 0.025 ($\times 10^{-3}$ W·$s^2$/kg), and the eddy current loss coefficient b of sample 2 was 0.021 ($\times 10^{-3}$ W·$s^2$/kg) as to the eddy current loss coefficient b. On the other hand, the eddy current loss coefficient b of sample 3 was 0.022 ($\times 10^{-3}$ W·$s^2$/kg), and the eddy current loss coefficient b of sample 4 was 0.048 ($\times 10^{-3}$ W·$s^2$/kg). The eddy current loss coefficient b of sample 5 was 0.024 ($\times 10^{-3}$ W·$s^2$/kg), and the eddy current loss coefficient b of sample 6 was 0.016 ($\times 10^{-3}$ W·$s^2$/kg). The heat resistance of samples 1, 2, 5 and 6 was superior to the heat resistance of sample 3, and equivalent to the heat resistance of sample 4.

Thus, samples 1, 2, 5 and 6 are smaller in the hysteresis loss coefficient a at heat-resistant temperature than sample 3 and exhibit b equivalent to sample 3, whereby it is understood that samples 1, 2, 5 and 6 are smaller in iron loss than sample 3. Further, samples 1, 2, 5 and 6 are close in value of the hysteresis loss coefficient a at heat-resistant temperature to sample 4 and smaller in value of b than sample 4, whereby it is understood that samples 1, 2, 5 and 6 are smaller in iron loss than sample 4. In other words, it is understood possible to reduce iron loss by forming insulating coatings 20*a* of the iron phosphate compound and insulating coatings 20*b* of the aluminum phosphate compound. Further, the heat resistance of each of samples 2 and 6 rises beyond the heat resistance of each of samples 1 and 5, whereby it is understood that the hysteresis loss further lowers due to formation of coatings 25 of silicone resin. In addition, the eddy current loss coefficient b of each of samples 2 and 6 is smaller than the eddy current loss coefficient b of each of samples 1 and 5, whereby it is understood that the eddy current loss further lowers due to formation of coatings 25 of silicone resin. Thus, it is understood possible to further reduce the iron loss by forming coatings 25 of silicone resin.

As to each of samples 5 and 6, the average particle diameter was 100 μm, and the thicknesses of the insulating coatings were 50 nm in insulating coatings 20*a* employed as the first insulating coating and 50 nm in insulating coatings 20*b* employed as the second insulating coating. The Fe/P atom abundance ratio on the contact surfaces between metal magnetic particles 10 and insulating coatings 20 evaluated through the X-ray photoelectron spectrometer was 12.9 or 13.6, and the Fe/P atom abundance ratio on the surfaces of the insulating coatings was 3.3 or 3.0. Thus, the Fe/P atom abundance ratio on the contact surfaces between metal magnetic particles 10 and insulating coatings 20 is larger than the Fe/P atom abundance ratio on the surfaces of the insulating coatings. Further, the Al/P atom abundance ratio on the contact surfaces between metal magnetic particles 10 and insulating coatings 20 is 0.7 or 0.8 and the Al/P atom abundance ratio on the surfaces of the insulating coatings is 2.2 or 2.0, and hence the Al/P atom abundance ratio on the contact surfaces between metal magnetic particles 10 and insulating coatings 20 is smaller than the Al/P atom abundance ratio on the surfaces of the insulating coatings.

The embodiments and Examples disclosed this time must be considered illustrative and not restrictive in all points. The scope of the present invention is shown not by the above description but by the scope of claim for patent, and it is intended that all modifications within the meaning and range equivalent to the scope of claim for patent are included.

The invention claimed is:

1. A soft magnetic material including a composite magnetic particle having a metal magnetic particle mainly composed of Fe and an insulating coating covering said metal magnetic particle, wherein said insulating coating contains a phosphate including Fe and a phosphate containing at least one type of atom selected from a group consisting of Al, Si, Mn, Ti, Zr and Zn, the number of Fe atoms contained in a contact surface of said insulating coating in contact with said metal magnetic particle is larger than the number of Fe atoms contained in the surface of said insulating coating, and the number of said at least one type of atom contained in the contact surface of said insulating coating in contact with said metal magnetic particle is smaller than the number of said at least one type of atom contained in the surface of said insulating coating.

2. The soft magnetic material according to claim 1, wherein said insulating coating has a first insulating coating covering said metal magnetic particle and a second insulating coating covering said first insulating coating, and said first insulating coating contains a phosphate including Fe, and said second insulating coating contains a phosphate and said at least one type of atom.

3. The soft magnetic material according to claim 1, wherein said composite magnetic particle further has an Si-containing coating covering the surface of said insulating coating.

4. A powder magnetic core prepared by pressure-molding the soft magnetic material according to claim 1.

* * * * *